Dec. 9, 1958
C. ELMER ET AL
2,863,869
MELAMINE PURIFICATION PROCESS
Filed May 21, 1956
2 Sheets-Sheet 1
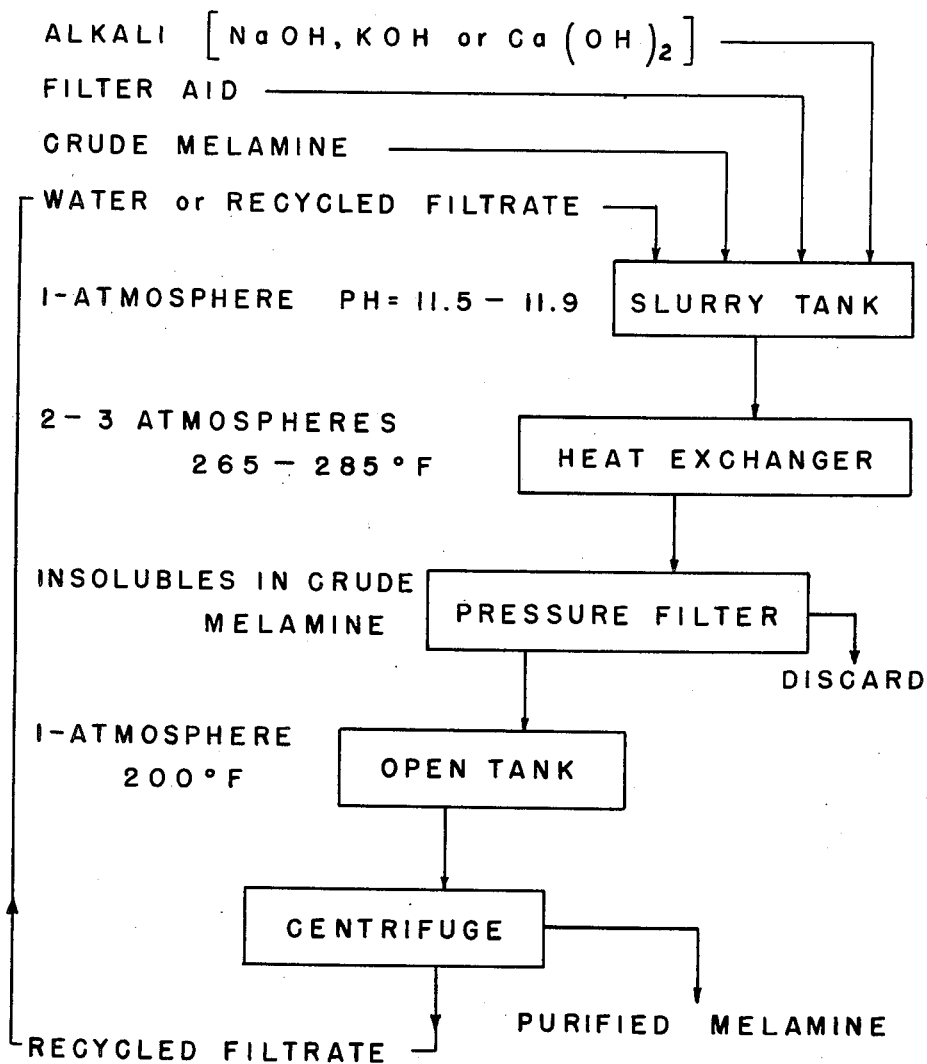
CURTIS ELMER
CLARENCE R. STANLEY INVENTORS
BY
ATTORNEY

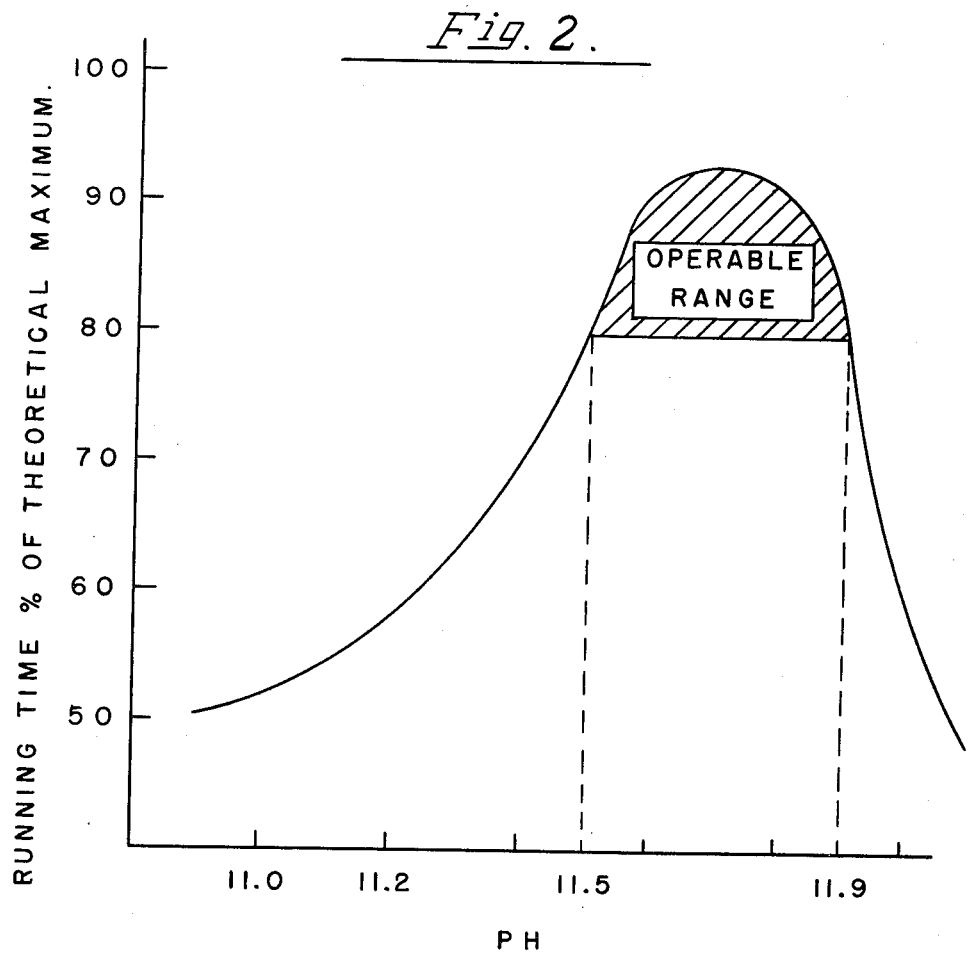

United States Patent Office 2,863,869
Patented Dec. 9, 1958

2,863,869

MELAMINE PURIFICATION PROCESS

Curtis Elmer, Springfield, and Clarence R. Stanley, Boston, Mass., assignors to Monsanto Chemical Company, St. Louis, Mo., a corporation of Delaware Application May 21, 1956, Serial No. 586,133

3 Claims. (Cl. 260—249.7)

The present invention relates to a melamine purification process. More particularly, the invention relates to a recycle recrystallization purification process that is carried at elevated temperatures and pressures.

The purification of melamine to a state of high purity presents many difficult problems. Although many purification processes have been proposed, all of the proposed processes are deficient in one or more respects in that; (1) they do not yield a product of sufficiently high purity, (2) they cause excessive losses of melamine in the purification process or (3) they require multiple processing steps.

It is an object of this invention to provide an improved process for purifying melamine.

Another object of this invention is to provide an improved melamine purification process which will give a product of exceptionally high purity.

Other objects and advantages of this invention will become apparent in the following detailed description thereof when read in conjunction with the attached drawings in which Fig. 1 is flow sheet illustrating the process of the present invention and Fig. 2 is a graph illustrating the effect of solution pH upon the efficiency of the present process.

In accordance with the present invention there is provided a highly efficient recycle recrystallization process which yields a melamine product of exceptionally high purity. The nature of this process will be apparent from the attached Fig. 1 which is a flow sheet of the present process. In starting up the process, water, crude melamine, a diatomaceous earth filter aid and an alkali, preferably sodium hydroxide but alternately calcium hydroxide or potassium hydroxide are added to a slurry tank. The feed to the tank is adjusted so that the slurry contains 9–12 parts of crude melamine and 100 parts of an aqueous solution having a pH in the range of 11.5–11.9. The resulting slurry is fed through a heat exchanger wherein the water is raised to a temperature of 265–285° C. and a pressure of 2–3 atmospheres. Substantially all of the melamine dissolves under these conditions. The solution of crude melamine is passed through a pressure filter without substantial loss of temperature and pressure and the filtrate is fed to a tank maintained at atmospheric pressure wherein the solution cools to below 212° F. and the bulk of the purified melamine crystallizes from the solution. The resulting suspension of melamine crystals is fed to a centrifuge or similar device wherein the purified melamine is recovered and the mother liquor containing small quantities of dissolved melamine is recycled to dissolve more crude melamine.

After several hours, the pressure filter will be filled with filter aid and the insolubles present in the crude melamine. When the pressure drop across the filter becomes excessively high, the operation is interrupted and the pressure filter is cleaned.

An outstanding feature of the process of the present invention is the extremely high purity obtained in the melamine product. The degree of purification in the melamine cannot easily be determined by ordinary methods, but it has been observed that clear butylated methylol melamine coating resins cannot be prepared unless the melamine is of extremely high purity. The purity of the melamine obtained by the process of this invention is illustrated by the following example.

*Example 1*

Two coating resins are prepared by the following method using, for one resin, the melamine purified by normal methods and, for the other, melamine purified by the process of this invention. Reflux 1 mol of melamine with 6 mols of formalin (37% formaldehyde) for about 0.5 hour at a pH of about 8.5. Then add 10 mols of dry butanol to the reaction mixture, adjust the pH to 5.5 with formic acid and continue the reaction under azeotropic distillation conditions until substantially all of the water of condensation and the water originally present in the formalin is removed. The product is a butylated methylol melamine in butanol solution. Concentrate the solution to 60% solids and add dry xylene to wind up with a 50% solids xylene-butanol solution of the resin. Allow the solution to stand at room temperature for several days. After about 24 hours, a bluish haze develops in the resin made from the ordinary melamine, which haze develops into a flocculent precipitate in from 2 to 7 days. The solution containing the resin made from the melamine purified by the process of this invention remains completely clear for at least 60 days.

The process of this invention is extremely sensitive and must be controlled within extremely close limits if satisfactory results are to be obtained. The temperature of the crystallizing solution must be maintained within the range of 265–285° C. before filtration, which temperature causes a concomitant rise in pressure to 2–3 atmospheres. The pH of the solution must be rigorously maintained within the range 11.5–11.9. If the pH is permitted to fall outside this range, difficultly filterable materials are formed which quickly plug the pressure filter. To illustrate the critical effect that pH has upon the process, several runs were made at each of several varying pH levels and the runs were continued until the pressure drop across the pressure filter required a shutdown. The amount of diatomaceous earth filter aid added to the slurry tank was sufficient to fill the pressure filter in approximately 8 hours and require a shutdown. Consequently, the difference in time between the actual operating cycle and 8 hours is caused by plugging of the pressure filter by impurities and/or degradation products in the system. The results of these several runs are set forth in Table I and plotted in Fig. 2.

Table I

| Solution | Average Running Time, Hours | Running Time, percent of Theoretical Capacity |
|---|---|---|
| 11.01–11.1 | 4.41 | 55 |
| 11.2–11.3 | 4.76 | 60 |
| 11.4–11.5 | 5.91 | 74 |
| 11.6–11.7 | 7.41 | 93 |
| 11.8–11.9 | 7.02 | 88 |
| 12.0–12.2 | 4.13 | 52 |

From the data of Table I and Fig. 2 it is seen that the pH has a most critical effect upon the efficiency of the process and must be closely controlled if satisfactory results are to be obtained. Within the pH range of 11.5–11.9 the process can be operated for about at least 80% of theoretical maximum cycle before plugging of the pressure filter necessitates a shutdown. At pH values above and below this narrow range, the efficiency falls off rapidly and the process can be operated for only relatively short periods of time before the pressure filter becomes plugged.

The above descriptions and examples are set forth by way of illustration only. Many other variations and modifications thereof will be apparent to those skilled in the art and can be made without departing from the spirit and scope of the invention herein described.

What is claimed is:

1. In a recycle recrystallization process for the purification of crude melamine in which crude melamine is dissolved in water at an elevated temperature, the heated aqueous melamine solution is filtered, the filtered aqueous melamine solution is cooled to precipitate purified melamine therefrom, the purified melamine is separated from the filtrate and the filtrate is recycled and employed as the solvent for the dissolution of additional crude melamine; the improvement which consists essentially of heating the aqueous solution of crude melamine to a temperature of 265–285° F. under a pressure of 2–3 atmospheres, adjusting the pH of the aqueous crude melamine solution to 11.5–11.9 with an alkali taken from the group consisting of sodium hydroxide, potassium hydroxide, and calcium hydroxide, adding a diatomaceous earth filter aid to the heated aqueous crude melamine solution and immediately thereafter passing the aqueous crude melamine solution through a pressure filter without a substantial loss of temperature or pressure, delivering the filtered melamine solution to a cool, open vessel to crystallize the melamine and separating the purified melamine crystals from the filtrate.

2. The process of claim 1 wherein the alkali employed is sodium hydroxide.

3. The process of claim 2 wherein the pH of the aqueous solution of crude melamine is maintained at a pH of about 11.7.

References Cited in the file of this patent

UNITED STATES PATENTS

| | | |
|---|---|---|
| 2,524,019 | Mackay | Sept. 26, 1950 |
| 2,734,059 | Hamilton | Feb. 7, 1956 |

FOREIGN PATENTS

| | | |
|---|---|---|
| 628,631 | Great Britain | Sept. 1, 1949 |
| 645,600 | Great Britain | Nov. 1, 1950 |